(No Model.)
C. N. ROUNTREE.
ROW GAGE FOR PLOWS.
No. 599,478. Patented Feb. 22, 1898.
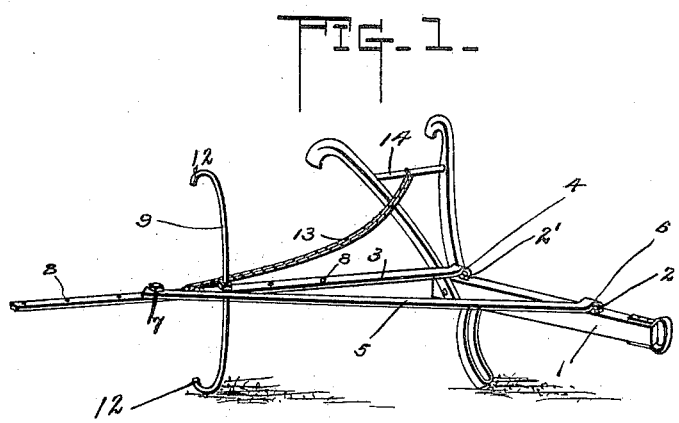
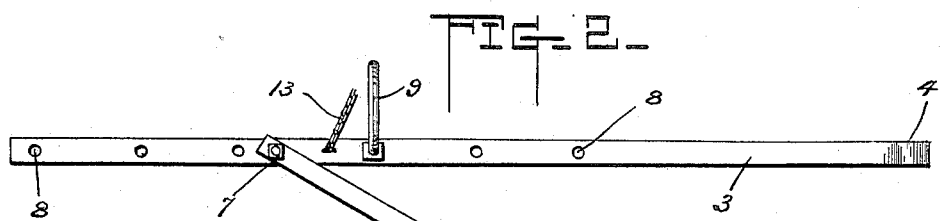
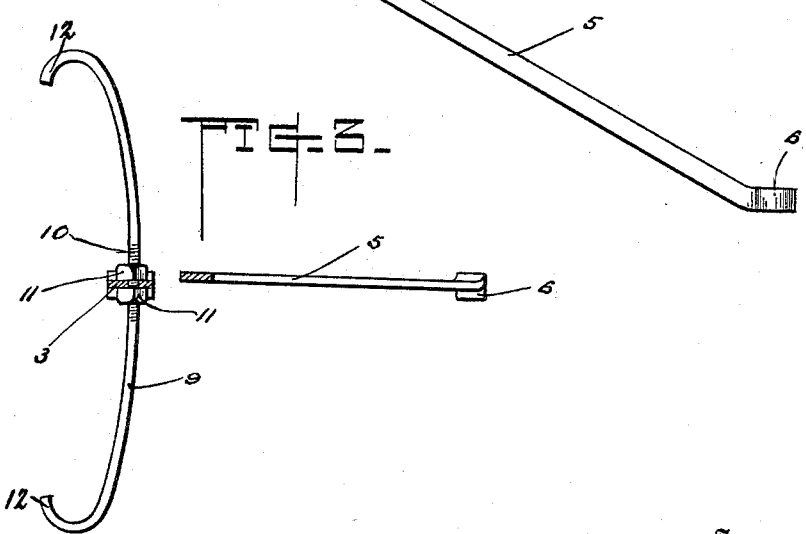
C. N. Rountree, Inventor
Witnesses
by H. B. Wilson, Attorney

UNITED STATES PATENT OFFICE.

CHARLES N. ROUNTREE, OF FORT VALLEY, GEORGIA.

ROW-GAGE FOR PLOWS.

SPECIFICATION forming part of Letters Patent No. 599,478, dated February 22, 1898.

Application filed June 3, 1897. Serial No. 639,296. (No model.)

*To all whom it may concern:*

Be it known that I, CHARLES N. ROUNTREE, a citizen of the United States, residing at Fort Valley, in the county of Houston and State of Georgia, have invented certain new and useful Improvements in Row-Gages for Plows; and I do declare the following to be a full, clear, and exact description of the invention, such as will enable others skilled in the art to which it appertains to make and use the same.

My invention relates to improvements in row-gages for plows, cultivators, seed-planters, and similar agricultural implements; and the object is to mark a row on either side of the line of draft which will serve as a guide for the next furrow.

To this end the novelty consists in the construction, combination, and arrangement of the same, as will be hereinafter more fully described, and particularly pointed out in the claims.

In the accompanying drawings the same reference characters indicate the same parts of the invention.

Figure 1 is a perspective view of my improved row-gage as applied to an ordinary plow. Fig. 2 is a top plan view of the same. Fig. 3 is a vertical section through the gage.

1 represents the plow-beam, and 2 2' the staples fixed to the upper face of said beam.

3 represents the gage-bar, provided at one end with a transverse eye 4, which engages the staples 2' and forms a hinge for the bar on the beam.

5 represents a diagonal brace provided at its inner end with an eye 6, by means of which it is pivoted to the staple 2, fixed on the beam. This brace extends diagonally rearward from the forward end of the beam, and its outer end is connected to the gage-bar 3 by a bolt 7 in such a manner as to secure said gage-bar at a right angle to the beam.

8 8 represent a series of transverse orifices in the gage-bar 3, in any one of which may be secured the crescent-shaped gage 9, the central portion 10 of which is screw-threaded to receive the clamp-nuts 11 11, by means of which the said gage may be adjustably secured to said gage-bar in a vertical position. The upper and lower ends 12 12 of said gage 9 are curved rearwardly to allow the end of the gage to pass freely over the ground. In practice of course the curved ends 12 12 of the gage 9 will in course of time wear out, and it is only necessary to remove one of the clamp-nuts 11, detach said gage, and replace it with a new one.

13 represents a chain having one end fixed to the handle-brace 14 and its outer end secured at a convenient point on the gage-bar 3 to prevent the latter from falling too low.

As will be seen, the brace-bar and gage may be thrown on either side of the beam to mark a gage-line for the next furrow on the left or right hand side of a furrow that is to be turned.

The shape of the ends of the gage is such as to permit it to ride freely over stones, roots, and other obstructions commonly met with in a field.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

1. The combination with the beam provided with staples 2 2', of the lateral gage-bar 3, hinged to the staple 2', and the diagonal brace 5 hinged to the staple 2 and having its outer end fixed to said hinged gage-bar, and the crescent-shaped gage 9 provided with the threaded central portion 10 and adjustably secured to said gage-bar by the nuts 11 11, substantially as shown and described.

2. The beam 1, provided with the fixed alined staples 2 2', in combination with the lateral gage-bar 3, provided with a series of transverse orifices 8 8, and eye 4, hinged to said staple 2', the diagonal brace 5 secured at its outer end to the bar 3 by the bolt 7, and provided with the eye 6, hinged to said staple 2, the crescent-shaped reversible gage 9, provided with the central threaded portion 10, the nuts 11 11, adapted to removably secure said gage in the orifices 8 8, in the bar 3, and the flexible chain 13, connecting said bar with the plow-handle brace 14, and adapted to support said bar in a horizontal position on either side of the beam, substantially as shown and described.

In testimony whereof I hereunto affix my signature in presence of two witnesses.

CHAS. N. ROUNTREE.

Witnesses:
 H. P. EVERETT,
 J. H. TURNER.